J. A. ROBERTSON & R. KROEDEL.
PHOTOGRAPHIC CAMERA.
APPLICATION FILED MAR. 8, 1912.
1,107,358.
Patented Aug. 18, 1914.
3 SHEETS—SHEET 1.
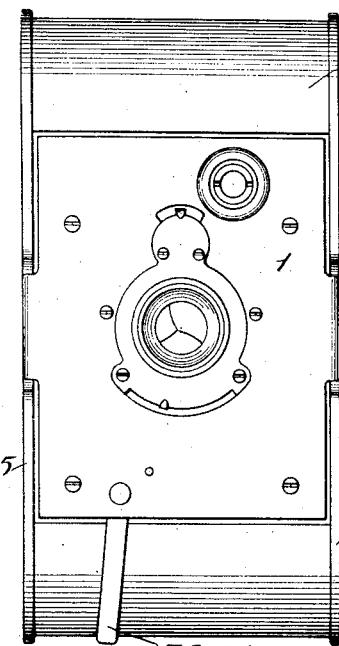
Fig. 1.
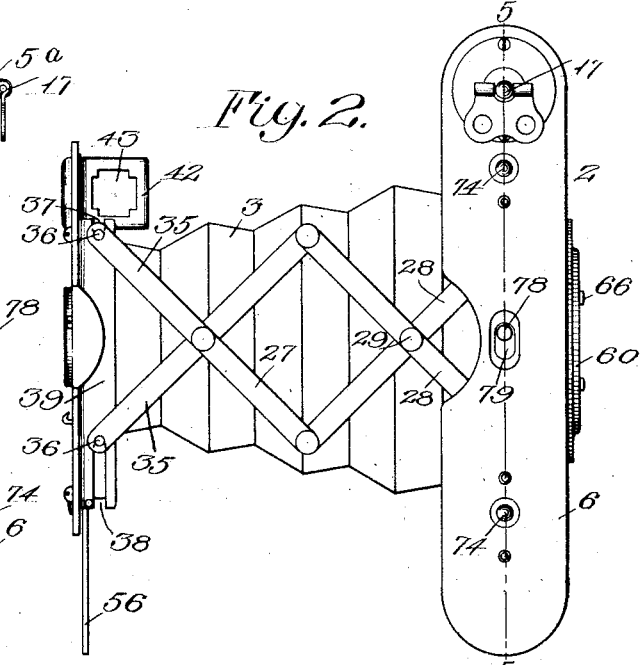
Fig. 2.
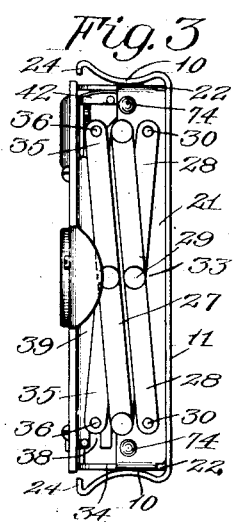
Fig. 3.
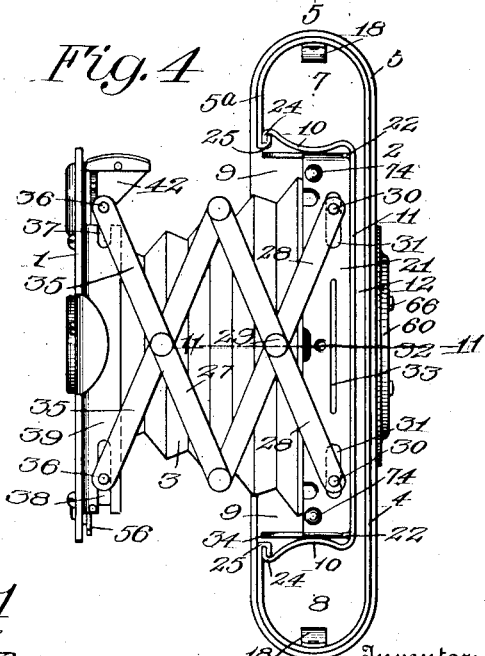
Fig. 4.
Fig. 11.
Witnesses
Florence E. Frank
Nelson H. Copp
Inventors
John A. Robertson
Robert Kroedel
By
their Attorneys J. A. ROBERTSON & R. KROEDEL.
PHOTOGRAPHIC CAMERA.
APPLICATION FILED MAR. 8, 1912.

1,107,358.

Patented Aug. 18, 1914.

3 SHEETS—SHEET 2.

Witnesses
Florence E. Frank
Nelson H. Copp

Inventors
John A. Robertson
Robert Kroedel
By
Their Attorney

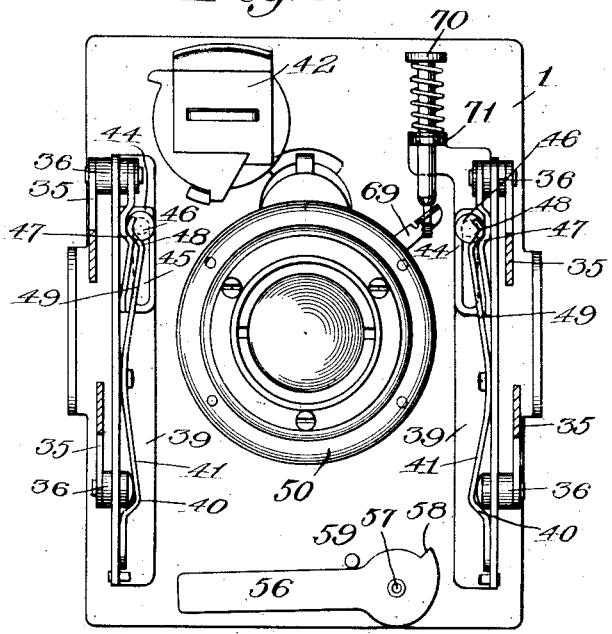

UNITED STATES PATENT OFFICE.

JOHN A. ROBERTSON AND ROBERT KROEDEL, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC CAMERA.

1,107,358.  Specification of Letters Patent.  Patented Aug. 18, 1914.

Application filed March 8, 1912. Serial No. 682,393.

*To all whom it may concern:*

Be it known that we, JOHN A. ROBERTSON and ROBERT KROEDEL, both of Rochester, in the county of Monroe and State of New York, have invented certain new and useful Improvements in Photographic Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras and has for one of its objects to provide certain improvements in general features of camera construction, particularly the construction of folding cameras whereby the camera is simplified with respect to both its construction and use.

More specifically, the improvements relate to the manner of supporting and projecting the bellows and front; to the mode of inserting and removing the spools; to the general assembling of the bellows and connected parts with the camera body, and to a provision whereby the air is enabled to escape easily and quickly from the bellows.

To these and other ends the invention consists in certain improvements and combinations of parts, all as will be hereinafter more fully described, the novel features being pointed out in the claims at the end of the specification.

Figure 5:
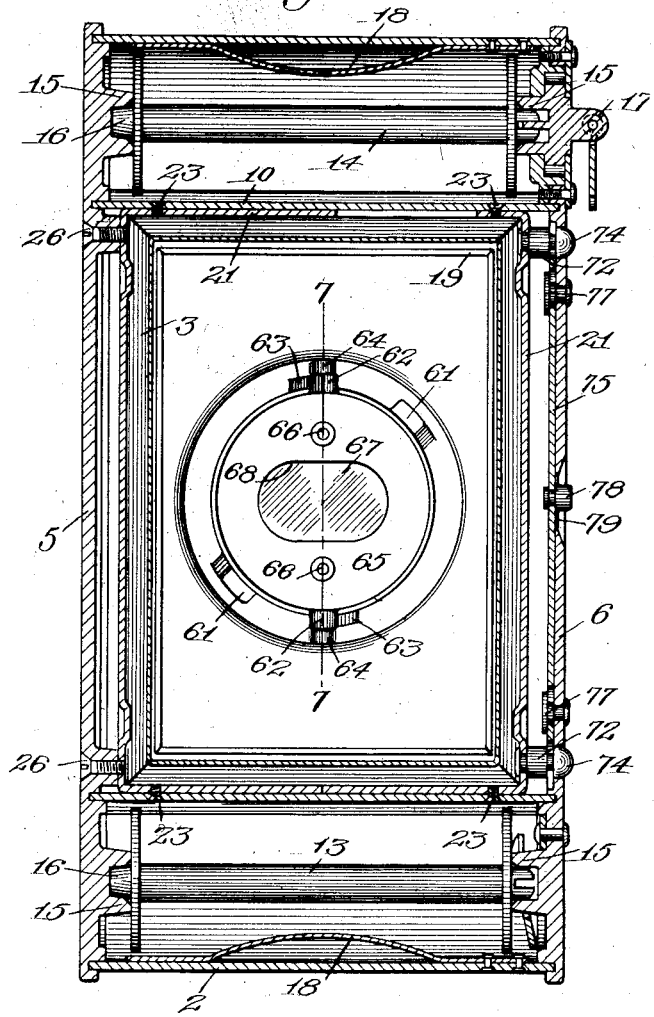
Figure 6:
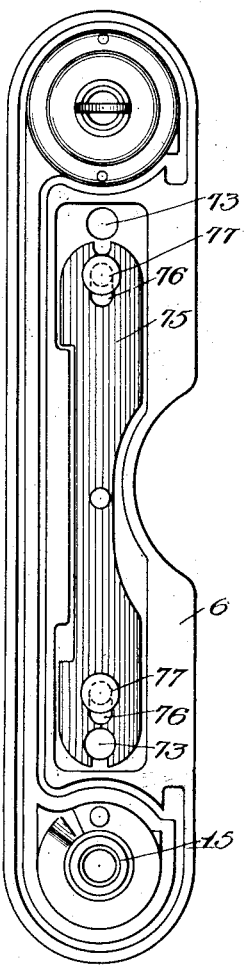
Figure 7:
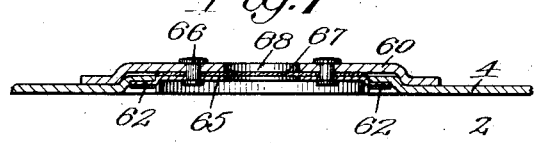

In the drawings: Figure 1 is a front elevation of a folding camera constructed in accordance with and illustrating one embodiment of our invention, the same being in open or extended position; Fig. 2 is a side elevation thereof; Fig. 3 is a side elevation of the bellows supporting means detached from the camera; Fig. 4 is a side elevation of the camera in a partially folded condition with the cover plate removed; Fig. 5 is a section taken substantially on the line 5—5 of Fig. 2; Fig. 6 is a bottom plan view of the cover plate; Fig. 7 is a detail section, enlarged, taken through the door on the camera back, substantially on the line 7—7 of Fig. 5; Fig. 8 is a rear elevation of the front with portions of the bellows support in projected position; Fig. 9 is a rear elevation of a portion of the front showing the positions of certain parts of Fig. 8 when the camera is folded; Fig. 10 is a central longitudinal section through the bellows and immediately adjacent parts, and Fig. 11 is a detail section on the line 11—11 of Fig. 4.

Similar reference numerals throughout the several figures indicate the same parts.

In the present embodiment of our invention we have shown a folding camera of the fixed focus type and which comprises a front, indicated generally by 1, a body, indicated generally by 2, and a flexible bellows 3 connecting these parts.

Referring more particularly to Figs. 3, 4, 5 and 6 the body proper or main casing 2 is formed of a back piece 4 and end pieces 5 and 6, the former of which last two mentioned parts is preferably rigidly or integrally connected to the back piece, while the last mentioned is removable. The back piece 4 may be formed of a single sheet of material having its ends turned forwardly and thence inwardly, as at 5$^a$, to constitute three walls of each of two film spool chambers 7 and 8, located at the top and bottom of the camera body, respectively, with a bellows chamber 9 between them. The remaining walls of these spool chambers are constituted by the forwardly turned ends 10 of a frame 11, the intermediate portion of which forms the front wall of the exposure chamber 12 which is merely a restricted film passage connecting the spool chambers.

A feed spool 13 is journaled in one of the film chambers and a winding spool 14 in the other, the film being fed from one to the other, as needed, through the exposure chamber 12 in the usual manner, the frame 11 acting as a guide therefor. Suitable boxes 15 are provided at the ends of the chambers for the trunnions 16 of the spools, and the latter are inserted endwise into the chambers and the cover plate 6 then applied in such manner that the boxes 15 carried thereby coöperate with the outer trunnions of the spools automatically, the spools fitting the chambers closely so that there will be no difficulty in centering them in their bearings. One of the boxes 15 on the cover plate 6 is rotatably mounted and provided with a suitable winding key 17 that engages a slot in one end of the spool, or otherwise coöperates therewith to rotate it for winding purposes. A leaf spring 18, mounted on a wall of each chamber 7—8 operates to maintain a tension on each film roll to prevent over-running and also tends to prevent the spools from falling out of the chambers when the cover plate 6 is removed, as it is evident from Fig. 5 that the springs must necessarily be compressed to admit the inner flange of the spool during insertion and removal. The cover plate 6 coöperates with the open ends of the film chambers and the exposure chamber 12 to constitute a single cover for all of them and is held in place by a suitable locking device, a specific form of which, that we prefer, will be hereinafter described.

The frame 11, of course, has an opening therein in the axis of the lens, as shown more particularly in Fig. 10, at the margin of which a forwardly projecting flange 19 is formed and fitting over this flange to fit the opening is a frame 20 to which the rear end of the bellows 3 is cemented or otherwise attached. The flange 19 holds this frame in place with respect to the axis of the lens and it is held against the frame 11 by another frame 21 having cut away portions 22 (Figs. 4 and 10) at opposite sides to receive beneath it opposite edges of the frame 20. The frames 11 and 21 are secured together in any suitable manner, as by the screws 23.

The forward ends of the bellows 3 and the front 1 to which it is connected are entirely supported on the frames 11 and 21 in a manner hereinafter described, and it will, therefore, be seen that all of these parts may be assembled, complete, independently of the body and then placed in position in the latter, to which end the forwardly extending portions 10 of the plate 11 and the inwardly turned portions 5 of the back 4 are provided with interlocking flanges 24 and 25 that may be slidably disengaged in a direction parallel with the focal plane of the camera and longitudinally of the axes of the film spools. As before mentioned, the frames 11 and 21 are fastened together at 23 and, therefore, screws or other suitable devices 26 (Fig. 5) extending through the fixed end plate 5 of the camera body and engaging the frame 21 hold both frames in place.

The outer end of the bellows 3 and the front 1 are supported in a projected position by a lazy tongs unit, indicated generally by 27, arranged at each side of the bellows. The free ends 28 of the links at the inner ends of each lazy tongs, which links are pivoted together at 29, are provided with studs 30 that slidably engage slots or other suitable guides 31 in the plate 21 permitting the extension and retraction of the lazy tongs and when the camera is folded an extension on the pivot 29 coöperates with the recessed portion 32 on the frame 21 to lock the lazy tongs support and the bellows in collapsed position within the chamber 9 (see Fig. 11). The frame 21 is preferably slotted at 33 adjacent to the recess 32 so that this portion thereof will yield slightly to assist the engagement and disengagement of the pivot 29.

When the camera is folded the front plate 1 closes the front of the bellows chamber 9, its inward movement being limited and positively arrested by forwardly projecting extensions 34 that may be formed on the frame 21.

The forward end of each lazy tongs is connected to the front 1, in the present instance, by providing the free end of the outer links 35 with studs 36 traveling in slots or guides 37 and 38 at the top and bottom respectively of a bracket plate 39 secured to the rear side of the front plate 1. When the camera is open and the lazy tongs is extended, the stud 36 will be near the top of the slots 38 in which position it is automatically engaged behind a locking shoulder 40 on a spring arm 41 secured on the inner side of the bracket plate 39 so that the lazy tongs is locked extended until sufficient pressure is exerted to cause the studs 36 to override the shoulder, which is done in folding the camera again. Thus, the lazy tongs support is locked in folded position by the operation of devices at the inner end thereof, and in extended position by the operation of devices arranged at its outer end. But the guiding and locking arrangements for the upper stud 36 at the outer end are different from those of the lower stud for the reason that the guides therefor cannot extend upwardly as far as they should to follow the full movement of the stud because of my preference in employing a two-way finder 42 at an elevated lateral position on the rear of the front plate 1. This finder is rotatably mounted so that the reflecting lens 43 thereof may be turned uppermost when the camera is used in either of the two positions in which cameras of this type are adapted for use, namely, with the film spools lying horizontally or vertically with respect to each other, and with the proportions of the camera illustrated a proper extension of the guide 37 for the upper forward stud 36 of the lazy tongs would intercept a view of the image with the finder adapted for one of these positions of use, as will be understood. We, therefore, provide this stud 36 with a sliding extension plate 44 (Figs. 8 and 9) having a slot 45 therein by means of which it is guided on a headed pin 46 on the front plate 1, said plate extending downwardly or toward the median line of the lazy tongs. The extension is L-shaped and the other portion thereof has a shoulder 47 that coöperates with a shoulder 48 on a spring arm 49 similar to the arm 41 to lock the stud in position when the lazy tongs is extended.

The specific feature of the finder 42 will form the subject matter of a separate application.

The camera shutter 50 is directly connected to the front plate 1 and the front end of the bellows 3 is connected to the front through the medium thereof to which end the rear of the shutter casing is fitted with a frame or plate 51 having a continuous rearwardly turned flange 52 forming a recess within which lies a frame 53 to which the bellows is directly attached by cementing or otherwise. Protuberances 54 formed up from this frame 53 at intervals (there being four in the present instance) space the frame 53 from the rear face or the frame 51 and the frame 53 is also spaced all around from the flange 52, the two frames being held together by screws 55, or other suitable means, so that a practically continuous passage is provided throughout the circumference of the outer end of the bellows which admits of the rapid entrance of air within the latter or its egress when the bellows are quickly extended or collapsed. Such provision is necessary in a camera of this type, as upon opening or unfolding the same the front is simply pulled out with a quick movement that instantly affects the air pressure within the bellows, both the inward and outward movements being limited by the action of the lazy tongs, as before mentioned, the present camera being of the fixed focus type. It will be noted, however, that because of the tortuous character of this passage due principally to the flange 52, the direct or reflected entrance of light therethrough into the interior of the bellows is prevented.

When in the extended position of Fig. 2 the front 1 may be positively supported on a stand by a suitable leg 56, (Figs. 2 and 8) pivoted at 57 to the front plate and having the folded position shown in Fig. 8. The operative position of this leg is determined by the position of the shoulder 58 thereon with the stop 59 on the front plate 1.

With the object of rendering the inner or rear side of the camera lens accessible for cleaning or other purposes an opening is provided in alinement therewith in the back 4 which opening has a removable cover 60 but bears on the outer side of the back plate. Recesses 61 in the margin of the opening admit radial projections 62 on the cover or door in applying the latter, and when the same is subsequently turned, these projections come up against stops 63 and rest in depressions 64 adjacent thereto on the front of the back plate adjacent the opening so that the door is held yieldably in locked position, the projection 62 being preferably on a spring plate 65 secured by rivets 66 and this plate may be also utilized as a frame for holding in place the transparent but non-actinic screen 67 for the peep-hole 68 through which indicating marks on the film may be seen, as usual, this peep-hole being formed in the door itself.

The operating lever 69 of the shutter 50 we prefer to arrange on the rear side of the plate 1 but it is not intended to be directly engaged by the hands of the operator. Instead, we provide a finger piece or button 70 connected thereto and guided in an extension bracket 71 of one of the bracket plates 39. When the camera is folded this finger piece 70 occupies an inaccessible position within the bellows chamber 9, being arranged as it is on the rear of the front plate, and it is therefore, protected as is the shutter operating member 69 so that there is no liability of its being inadvertently actuated, the shutter operated, and a length of film spoiled.

The specific means before alluded to that we prefer to employ for locking the cover plate 6 in position comprises a pair of projections 72 extending laterally from the frame 21 and which enter recesses 73 in the cover plate. These projections are headed, as at 74, and a sliding bolt 75 on the under side of the cover plate, guided at 76 on pins 77 is moved into and out of engagement with the said heads 74 by means of an abutment 78 secured thereto and accessible on the exterior of the plate 76 through a slot 79.

We claim as our invention:

1. In a camera, the combination with a body having a back, and spool chambers at opposite ends thereof, the outer walls of which are constituted by the body, of a detachable and replaceable inner frame coöperating with the body and having portions forming the inner walls of the respective chambers.

2. In a camera, the combination with a body having a back, and spool chambers at opposite ends thereof the outer walls of which are constituted by the body, of a detachable and replaceable inner frame slidably coöperating with the body to be detached therefrom in a direction longitudinally of the spool chambers and having portions constituting the inner walls of the respective chambers.

3. In a camera, the combination with a body having spool chambers at opposite ends thereof, of a frame coöperating with the body and having portions forming walls of the respective chambers and interlocking flanged portions at the terminating edges of the frame and body, respectively, slidably coöperating with each other to permit the detachment and replacement of the frame in a direction longitudinally of the film chamber.

4. In a camera, the combination with a body having spool chambers at its ends, the front, back and outer walls of which are formed by the body, of a detachable and replaceable substantially U-shaped frame cooperating with the body and comprising end portions, respectively, forming the inner wall of each chamber and an intermediate portion constituting a film guide extending between the chambers.

5. In a camera, the combination with a body embodying a back plate having forwardly and inwardly turned end portions, of a detachable and replaceable frame, coöperating with the body and comprising forwardly turned end portions slidably coöperating with the end portions of the back plate to form spool chambers jointly therewith and an intermediate portion spaced from the back plate to form a restricted film passage and exposure chamber extending between the spool chambers, said frame being detachable from the body in a direction longitudinally of the spool chambers.

6. In a camera, the combination with a body provided with spool chambers and an intermediate exposure chamber, of a separate and removable cover for all of said chambers coöperating with and acting as a closure for the ends of the spool chambers and means for securing the cover on the body comprising a rigidly connected projection on one of said parts and a sliding bolt on the other coöperating therewith.

7. In a camera, the combination with a body provided with spool chambers and an intermediate exposure chamber, of a separate and removable cover for all of said chambers coöperating with and acting as a closure for the ends of the spool chambers and means for securing the cover on the body comprising a rigidly connected projection on one of said parts, a recessed portion on the other into which the projection is adapted to extend and a bolt on said last mentioned part movable into and out of interlocking engagement with the projection to hold it in the recessed portion.

8. In a folding camera, the combination with a body, of a detachable and replaceable frame coöperating therewith and adapted to be removed therefrom in a direction parallel with the focal plane of the camera, a bellows connected to the latter at one end, a front to which the other end of the bellows is connected and means connecting the front and frame for wholly supporting the former on the latter whereby the bellows and front are removable from the body with the frame.

9. In a folding camera, the combination with a frame at the front of the exposure chamber and a second frame secured to the first, of a bellows, a front connected to the front end of the bellows and a frame connected to the rear end of the latter and held in position by the coöperation of the first two mentioned frames.

10. In a folding camera, the combination with a frame at the front of the exposure chamber and a second frame secured to the first, of a bellows, a front to which the forward end of the bellows is connected, a frame connected to the rear end of the latter and held in position by the coöperation of the first two mentioned frames and an extensible support for the front carried by the second frame.

11. In a folding camera, the combination with a frame at the front of the exposure chamber having an opening and forwardly projecting flanges at the margin of the opening, of a bellows, a frame to which the rear end thereof is connected, surrounding said flanges and a second frame coöperating with the first mentioned frame to hold the bellows frame against the latter.

12. In a folding camera, the combination with a frame at the front of the exposure chamber and a second frame secured to the first and having forwardly projecting extensions thereon, of a bellows, a front connected to the front end of the bellows, an extensible and collapsible support for the front and a frame connected to the rear end of the latter and held in position by the coöperation of the first two mentioned frames, the extensions on the second frame serving to limit the inward movement of the first when the bellows and support are collapsed.

13. In a camera, the combination with a body provided with spool chambers and an intermediate exposure chamber, of a bellows, a frame at the rear end thereof for securing it to the front of the exposure chamber, a projection on said frame, a cover for all of said chambers coöperating with and acting as a closure for the ends of the spool chambers and provided with a recess receiving the beforementioned projection and a locking device on the cover adapted to coöperate with the projection.

14. In a folding camera, the combination with a bellows and a frame at one end thereof, of an extensible and collapsible support for the bellows embodying a lazy tongs, guides for the free end of one of the lazy tongs links, a pivot connecting said links and a depression in the frame with which said pivot coöperates to maintain the lazy tongs support in collapsed position.

15. In a folding camera, the combination with a bellows and a frame at one end thereof, of an extensible and collapsible support for the bellows embodying a lazy tongs comprising links, one of which is connected to the frame by a sliding pivot and a yielding catch on the frame provided with a shoulder coöperating with said sliding connection to lock the support in one of its positions.

16. In a folding camera, the combination with a bellows and a frame at one end thereof, of an extensible and collapsible support for the bellows embodying a lazy tongs comprising links, one of which is connected to the frame by a sliding pivot, an extension on said pivot extending in the direction of the median line of the lazy tongs and provided with a locking shoulder, and a yielding catch provided with a shoulder adapted to coöperate with the first mentioned shoulder to lock the support in one of its positions.

17. In a folding camera, the combination with a bellows and a front connected thereto, of an extensible and collapsible support for the front embodying a lazy tongs, means at one end thereof for locking it in one of its said positions and means at the other end thereof for locking it in the other of its said positions.

18. In a folding camera, the combination with a bellows, and a recessed supporting part at one end thereof, of a frame secured to said end of the bellows and lying in the recess but spaced therefrom, said frame being connected to the support at a plurality of separated points.

19. In a folding camera, the combination with a supporting part embodying a frame having a continuous outwardly extending flange, of a bellows, a frame connected to one end thereof and lying within the flanges of the first mentioned frame, and means for spacing the bellows frame from the supporting frame and from the flange thereof, leaving a practically continuous passage between the frames for the purpose set forth.

20. In a folding camera, the combination with a body having a fixed back, a bellows and a lens at the outer end thereof foldable to a position adjacent the back, said back being provided with an opening in alinement with the lens, of a removable closure for said opening having a rotary interlocking connection with the back.

JOHN A. ROBERTSON.
ROBERT KROEDEL.

Witnesses:
H. E. STONEBRAKER,
HENRY W. HALL.